(12) United States Patent
Hahm et al.

(10) Patent No.: US 7,748,314 B2
(45) Date of Patent: Jul. 6, 2010

(54) FERMENTATION APPARATUS FOR CUSTOMIZING FERMENTATION LEVEL AND METHOD THEREOF

(75) Inventors: Kyung-hee Hahm, Seoul (KR); Jae-seung Lee, Hwaseong-si (KR); Joo-young Ha, Seoul (KR)

(73) Assignee: Samsung Electronics Co., Ltd., Suwon-Si (KR)

( * ) Notice: Subject to any disclaimer, the term of this patent is extended or adjusted under 35 U.S.C. 154(b) by 1254 days.

(21) Appl. No.: 11/288,154

(22) Filed: Nov. 29, 2005

(65) Prior Publication Data
US 2006/0228444 A1 Oct. 12, 2006

(30) Foreign Application Priority Data
Apr. 6, 2005 (KR) .................. 10-2005-0028498

(51) Int. Cl.
*A47J 39/00* (2006.01)
(52) U.S. Cl. .................. 99/468; 99/281; 99/326; 99/483; 99/516; 62/157; 219/506; 219/530; 426/231
(58) Field of Classification Search ........... 99/275–323, 99/326–333, 348, 352–355, 467–479, 485–491, 99/516–536, 483, 451; 435/289–291, 313–316; 62/229, 157, 187, 253, 115–117; 219/400, 219/530, 506, 531; 426/231–233
See application file for complete search history.

(56) References Cited

U.S. PATENT DOCUMENTS 5,555,797 A 9/1996 Chun
5,771,788 A * 6/1998 Lee et al. .................. 99/468
6,063,420 A * 5/2000 Chun et al. .................. 426/231
6,089,146 A * 7/2000 Nam et al. .................. 99/468
6,253,668 B1 * 7/2001 Lee .................. 99/468

FOREIGN PATENT DOCUMENTS

KR 1990-8828 11/1990

(Continued)

OTHER PUBLICATIONS

Korean Office Action issued Jul. 28, 2006 with respect to Korean Application No. 10-2005-0028498, which corresponds to the above-referenced application.

*Primary Examiner*—Mark H Paschall
(74) *Attorney, Agent, or Firm*—Staas & Halsey LLP (57) ABSTRACT

The present invention relates to a fermentation apparatus comprising a storage compartment which is formed with an accommodating space for storing food and at least one of a heating part and a cooling part to ferment the food in the storage compartment, further comprising a sensor to sense a fermentation level of the food; an input part comprising a memory button allowing to memorize the fermentation level in a state that the food is fermented to an extent that a user wants to memorize; and a controller to control operation of at least one of the heating part and the cooling part, and store a fermentation value from the sensor as a custom fermentation value if the memory button is selected. Thus, the present invention provides a fermentation apparatus for customizing a fermentation level and a method thereof, which memorizes a desired fermentation level and repeatedly provides food at a desired fermentation level by selecting a memorized fermentation level.

19 Claims, 13 Drawing Sheets

FOREIGN PATENT DOCUMENTS

| | | |
|---|---|---|
| KR | 1991-2928 | 5/1991 |
| KR | 1995-5781 | 5/1995 |
| KR | 1996-11622 | 8/1996 |
| KR | 2000-33160 | 6/2000 |
| KR | 2001-0113246 | 12/2001 |
| KR | 10-2004-0056069 | 6/2004 |

* cited by examiner

FERMENTATION APPARATUS FOR CUSTOMIZING FERMENTATION LEVEL AND METHOD THEREOF

CROSS-REFERENCE TO RELATED APPLICATIONS

This application claims the benefit of Korean Patent Application No. 2005-0028498, filed on Apr. 6, 2005, in the Korean Intellectual Property Office, the disclosure of which is incorporated herein by reference.

BACKGROUND OF THE INVENTION

1. Field of the Invention

The present invention relates to a fermentation apparatus for customizing a fermentation level and a method thereof.

2. Description of the Related Art

Generally, foods such as wine, soybean paste, soy sauce, kimchi, vinegar, cheese etc. are fermented under predetermined periods of time, temperature, humidity, etc. to add flavor and taste in the manufacturing process.

Figure 1A:
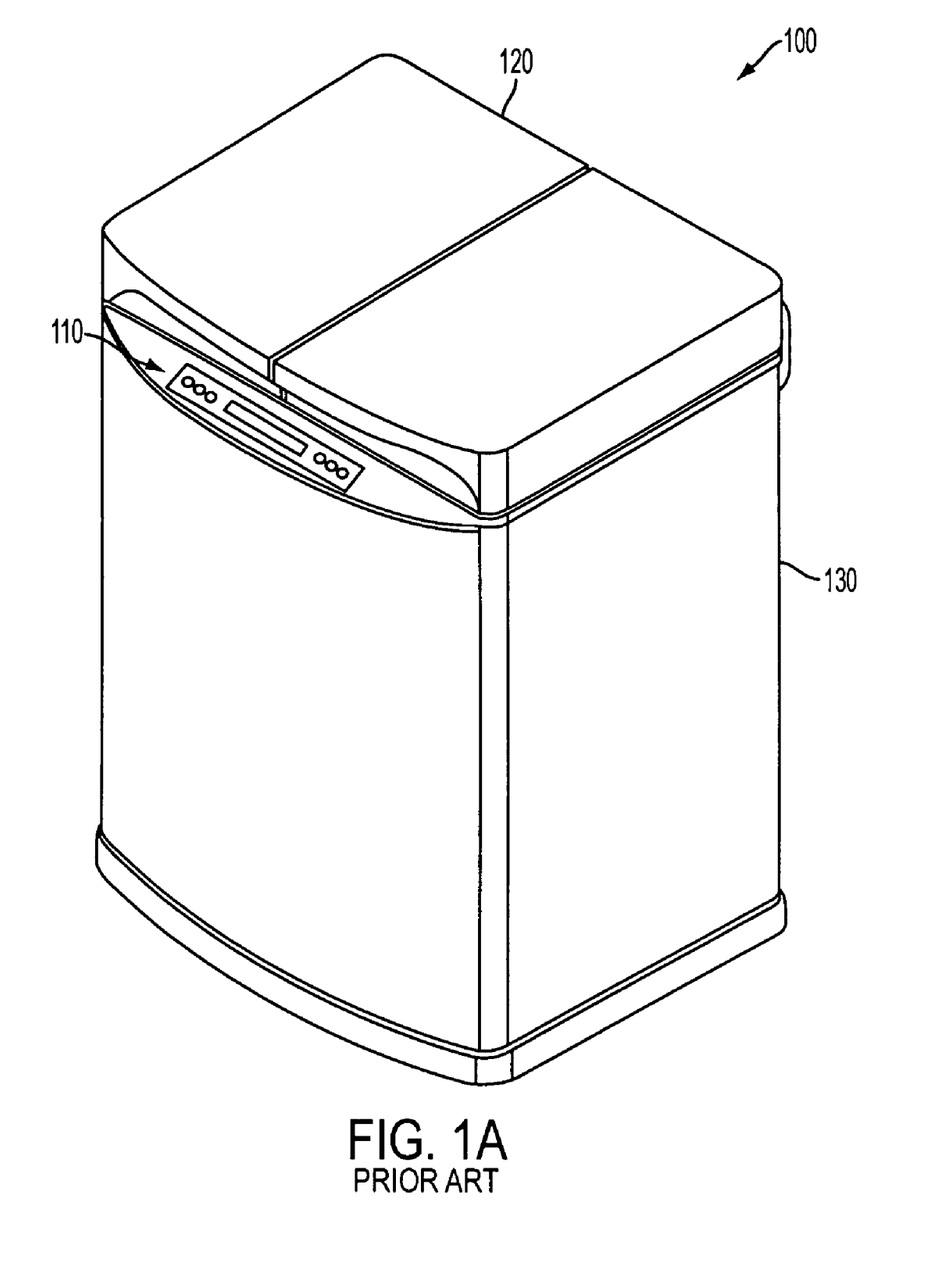
FIG. 1a is a perspective view of a conventional kimchi refrigerator.

The fermentation method varies according to fermented food. For example, kimchi was conventionally stored in a container such as a kimchi jar to be buried in the ground, or kept for a predetermined period of time at room temperature. However, a kimchi refrigerator as shown in FIG. 1a is widely used for fermenting kimchi recently.

A kimchi refrigerator 100 operates in a fermentation mode and a refrigeration mode to ferment and refrigerate kimchi. Such a kimchi refrigerator 100 comprises one or more storage compartments formed with an accommodating space for storing kimchi therein; a main body 130 comprising a heating part for operating the storage compartments into the fermentation mode and a cooling part for operating the storage compartments into the refrigeration mode after completing the fermentation of kimchi; and a door 120 to open and close an opening of the main body 130 and close an interior of the main body 130.

Figure 1B:
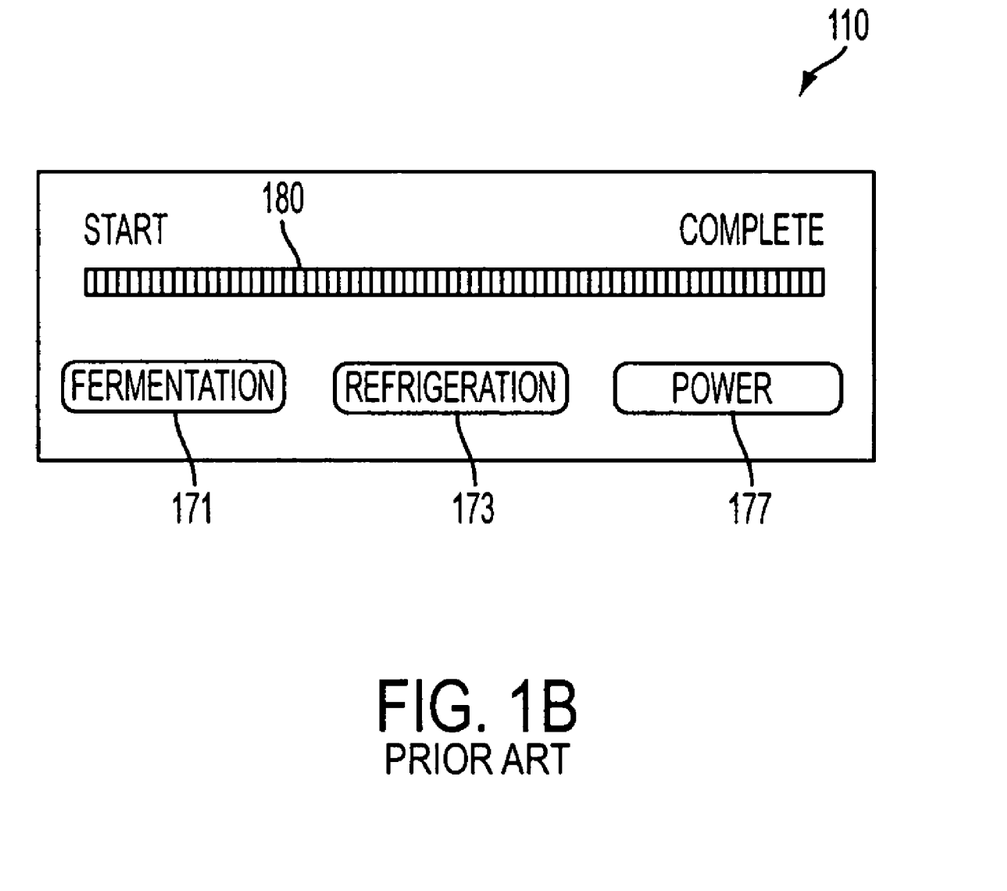

As shown in FIG. 1b, a front surface of the kimchi refrigerator 100 is provided with an input/display panel 110 which comprises a power button 177 to operate the kimchi refrigerator 100; a fermentation button 171 to operate in the fermentation mode; a refrigeration button 173 to manually convert into the refrigeration mode after completing the fermentation of kimchi; and an input/display panel 110 provided with a display part 180 to display a fermentation level while operating in the fermentation mode.

Figure 1C:
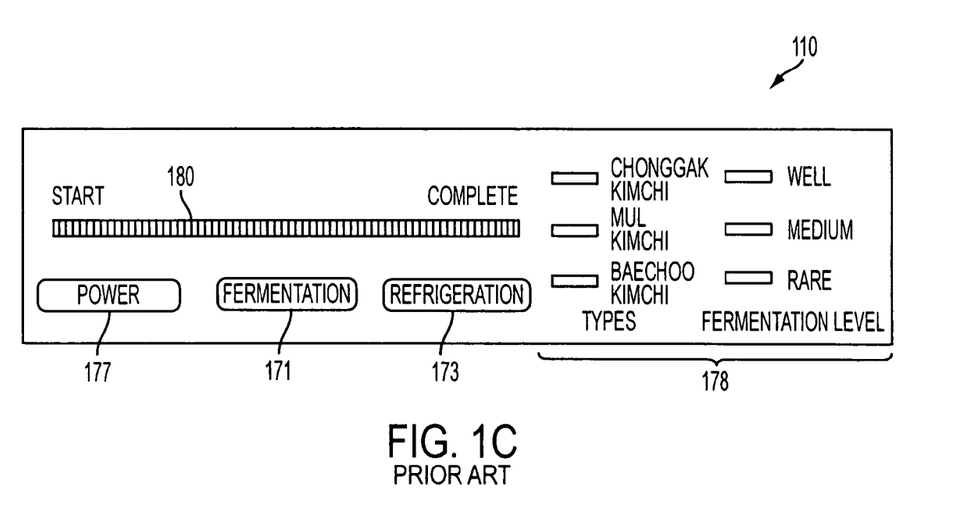

As shown in FIG. 1c, an automatic fermentation button 178 may be provided according to devices, with which a user may select types of kimchi and the fermentation level. That is, if a user selects the automatic fermentation button 178, the kimchi refrigerator 100 ferments kimchi automatically until reaching the selected fermentation level, and then is converted into the refrigeration mode.

However, when fermenting kimchi in the convention method, a user should repeatedly check the taste or smell of kimchi to see if it is being fermented as a user wants.

Also, the kimchi refrigerator having the automatic fermentation function is uniformly set with types and fermentation levels of the fermented food while being manufactured, thereby providing a limited range of fermentation levels and repeating inconvenience in the conventional fermentation method if the provided fermentation level does not meet a user's demand.

SUMMARY OF THE INVENTION

Accordingly, it is an aspect of the present invention to provide a fermentation apparatus for customizing a fermentation level and a method thereof, which memorizes a desired fermentation level and repeatedly provides food at a desired fermentation level by selecting a memorized fermentation level.

Additional aspects and/or advantages of the present invention will be set forth in part in the description which follows and, in part, will be obvious from the description, or may be learned by practice of the present invention.

The foregoing and/or other aspects of the present invention are also achieved by providing a fermentation apparatus comprising a storage compartment which is formed with an accommodating space for storing food and at least one of a heating part and a cooling part to ferment the food in the storage compartment, further comprising a sensor to sense a fermentation level of the food; an input part comprising a memory button allowing to memorize the fermentation level in a state that the food is fermented to an extent that a user wants to memorize; and a controller to control operation of at least one of the heating part and the cooling part, and store a fermentation value from the sensor as a custom fermentation value if the memory button is selected.

According to an aspect of the present invention, the controller controls the sensor to sense the fermentation level of the food if the memory button is selected.

According to an aspect of the present invention, the input part further comprises a memory display to display storage of the custom fermentation value by the controller.

According to an aspect of the present invention, the controller stores a plurality of custom fermentation values.

According to an aspect of the present invention, the input part is provided with the memory button and the memory display corresponding to the number of the custom fermentation values.

According to an aspect of the present invention, the input part is provided with a single memory button and a plurality of memory displays corresponding to the number of the custom fermentation values.

According to an aspect of the present invention, the controller controls the cooling part to stop fermenting the food and convert into a refrigeration mode if the memory button is selected.

According to an aspect of the present invention, the sensor is provided as one of a gas sensor and a pH sensor.

According to an aspect of the present invention, the controller controls the sensor to sense the fermentation level of the food, and controls at least one of the heating part and the cooling part to keep fermenting the food until the fermentation value sensed from the sensor reaches the selected custom fermentation value if a custom fermentation is performed through selection of the memory button corresponding to the stored custom fermentation value.

According to an aspect of the present invention, the controller controls the cooling part to stop fermenting the food and automatically convert into the refrigeration mode if the fermentation value sensed from the sensor reaches the selected custom fermentation value.

According to an aspect of the present invention, the fermentation apparatus further comprises an alarm to notify the completion of fermenting the food by the controller if the fermentation value sensed from the sensor reaches the selected custom fermentation value.

The foregoing and/or other aspects of the present invention are also achieved by providing a fermentation apparatus comprising a storage compartment which is formed with an accommodating space for storing food and at least one of a heating part and a cooling part to ferment the food in the storage compartment, further comprising a sensor to sense a fermentation level of the food; an input part comprising at least one memory button allowing to memorize the fermentation level in a state that the food is fermented to an extent that a user wants to memorize; a memory to store a fermentation value; and a controller to store the fermentation value from the sensor as a custom fermentation value in the memory if the memory button is selected.

According to an aspect of the present invention, the memory is stored with a plurality of custom fermentation values by the controller.

According to an aspect of the present invention, the controller controls the cooling part to stop fermenting the food and convert into the refrigeration mode if the memory button is selected.

According to an aspect of the present invention, the controller controls the sensor to sense the fermentation level of the food, and controls at least one of the heating part and the cooling part to keep fermenting the food until the fermentation value sensed from the sensor reaches the selected custom fermentation value if a custom fermentation is performed through selection of the memory button corresponding to the stored custom fermentation value.

According to an aspect of the present invention, the memory is stored with the fermentation value, in advance, corresponding to at least one of a gas concentration value and a pH value according to a plurality of fermentation levels of food to be fermented.

According to an aspect of the present invention, the fermentation apparatus further comprises a display part to display the fermentation level of the food, wherein the controller compares the fermentation value from the sensor and the fermentation value stored in the memory to determine the fermentation level of the food and display information on the determined fermentation level on the display part.

The foregoing and/or other aspects of the present invention are also achieved by providing a customizing fermentation method to set a fermentation level of food by a user, comprising storing food in a storage compartment to ferment it; fermenting the food in the storage compartment; sensing the fermentation level of the food through a sensor; selecting a memory button allowing to memorize the fermentation level of the food in a state that the food is fermented to an extent that a user wants to memorize; storing a sensed fermentation value of the food as a custom fermentation level, which is sensed when selecting the memory button.

According to an aspect of the present invention, the customizing fermentation method further comprises completing fermenting the food to convert into a refrigeration mode if the memory button is selected.

According to an aspect of the present invention, the customizing fermentation method further comprises restoring food in the storage compartment to ferment it; selecting the stored custom fermentation value by a user; fermenting the food in the storage compartment; sensing the fermentation level of the food through the sensor; and completing fermenting the food if sensed that the fermentation value of the food reaches the custom fermentation value.

According to an aspect of the present invention, the customizing fermentation method further comprises completing fermenting the food to automatically convert into the refrigeration mode.

According to an aspect of the present invention, the customizing fermentation method further comprises notifying the completion of fermenting the food if the fermentation value of the food reaches the custom fermentation value.

BRIEF DESCRIPTION OF THE DRAWINGS

The above and/or other aspects and advantages of the present invention will become apparent and more readily appreciated from the following description of the embodiments, taken in conjunction with the accompanying drawings of which:

FIGS. 1b and 1c illustrate input and display parts of the conventional kimchi refrigerator in FIG. 1a;

DETAILED DESCRIPTION OF THE PREFERRED EMBODIMENTS

Reference will now be made in detail to the embodiments of the present invention, examples of which are illustrated in the accompanying drawings, wherein like reference numerals refer to like elements throughout.

First Embodiment

Figure 2:
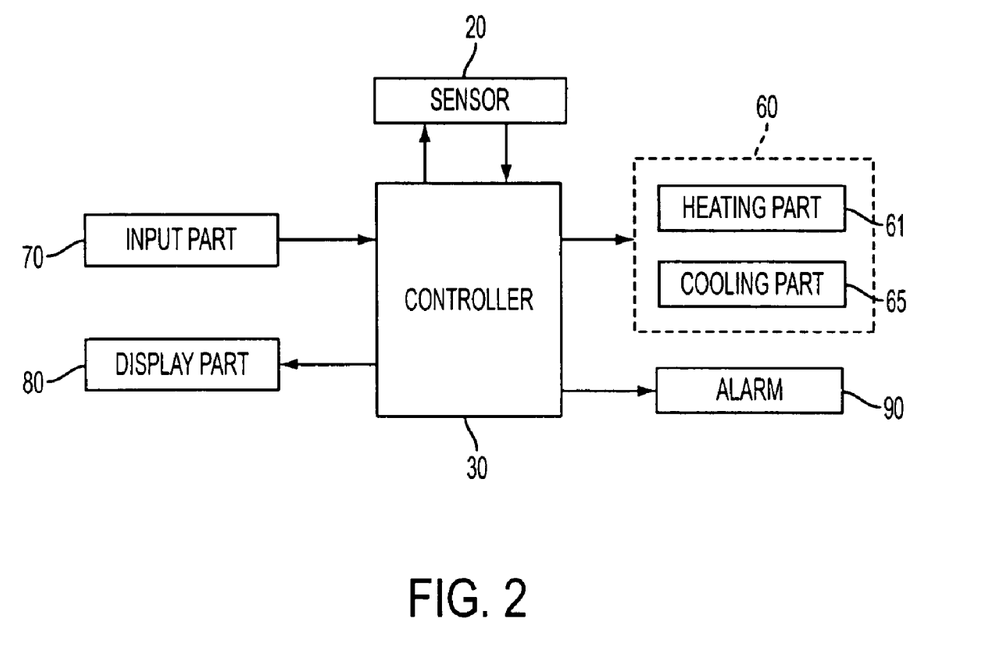
FIG. 2 is a configuration block diagram of a fermentation apparatus according to a first embodiment of the present invention.
Figure 3:
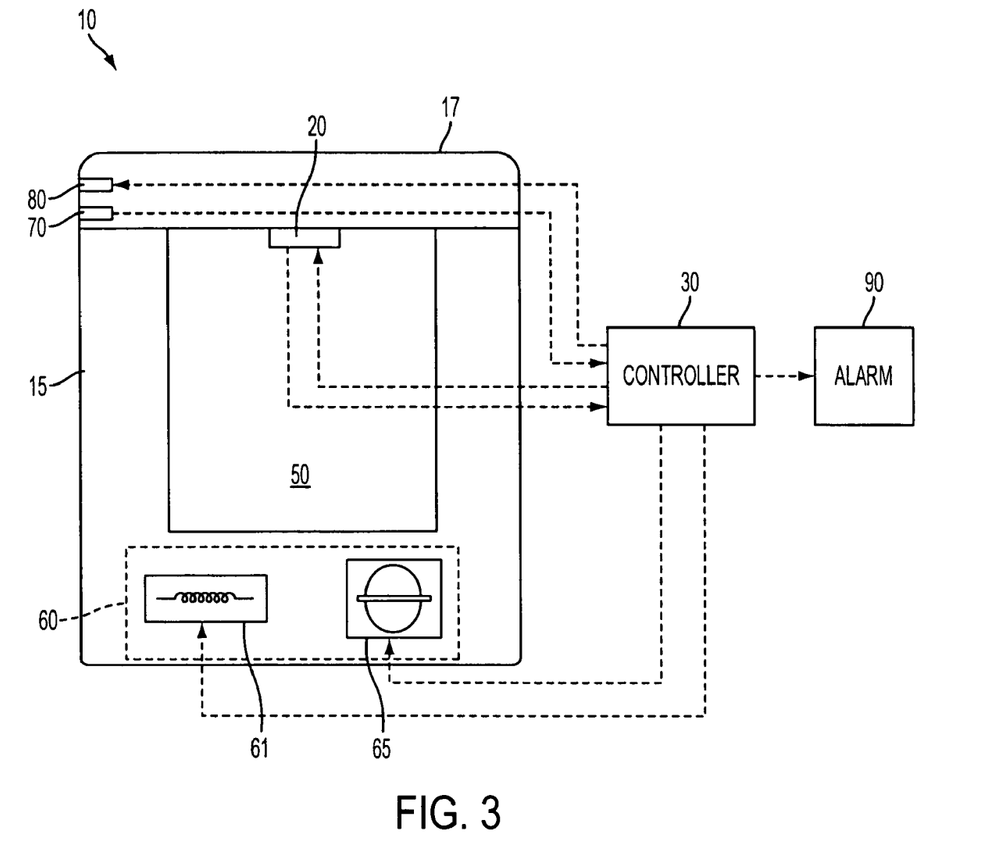
FIG. 3 is a lateral sectional view of the fermentation apparatus in FIG. 2.

Referring to FIGS. 2 and 3, a fermentation apparatus 10 according to a first embodiment of the present invention comprises a storage compartment 50, a heating/cooling part 60 for heating and cooling the storage compartment 50, an input part 70, a sensor 20 and a controller 30. The fermentation apparatus 10 may further comprise a display part 80 and an alarm 90.

The storage compartment 50 forms an accommodating space to store food in a main body 15. The storage compartment 50 may be provided as single or plural compartments in the main body 15, as necessary. If the storage compartment 50 is plurally provided, each of the compartments 50 is divided by an insulating material. The compartments 50 may operate uniformly as a whole, or perform fermentation and refrigeration functions independently.

The heating/cooling part 60 is provided as at least one of a heating part 61 and a cooling part 65 to ferment food in the storage compartment 50. For example, if room temperature is lower than the fermentation temperature, only the heating part 61 may be provided. If the room temperature is higher than the fermentation temperature, only the cooling part 65 may be provided. Alternatively, both the heating part 61 and the cooling part 64 may be provided to ferment and refrigerate food. Here, the heating part 61 may be provided as an electric resistance heating element, but not limited thereto. The cooling part 65 may be comprised of a cooling cycle having a compressor. At this time, an outer wall of the respective storage compartments 50 is surrounded by a refrigerant pipe and a heater.

Figure 4A:
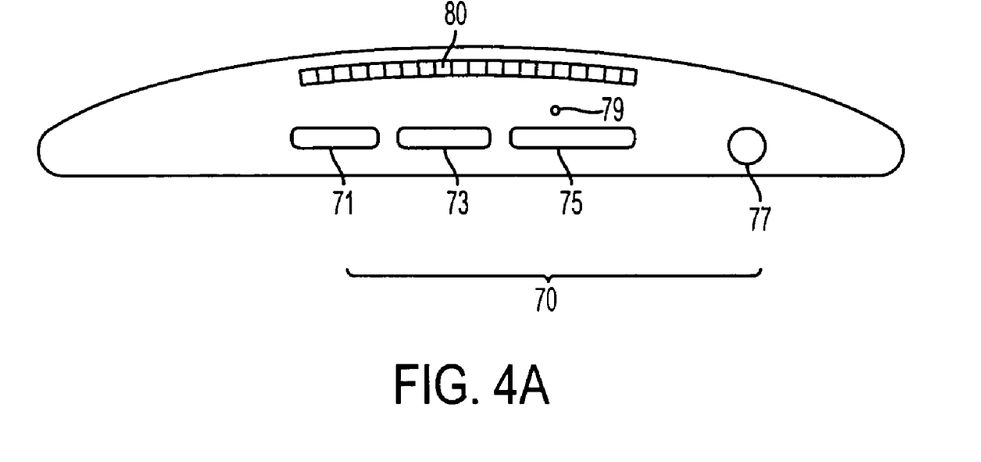
FIGS. 4a through 4d illustrate various embodiments of the input part and display part of the fermentation apparatus in FIG. 2.
Figure 4B:
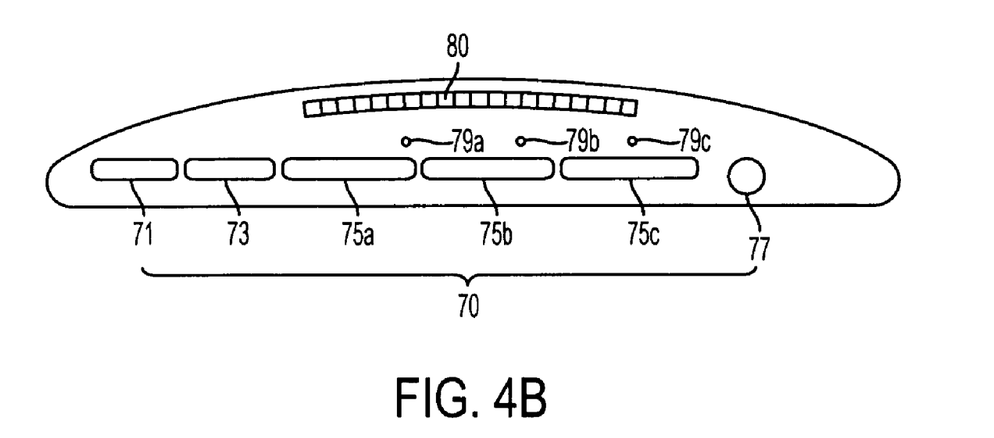
Figure 4C:
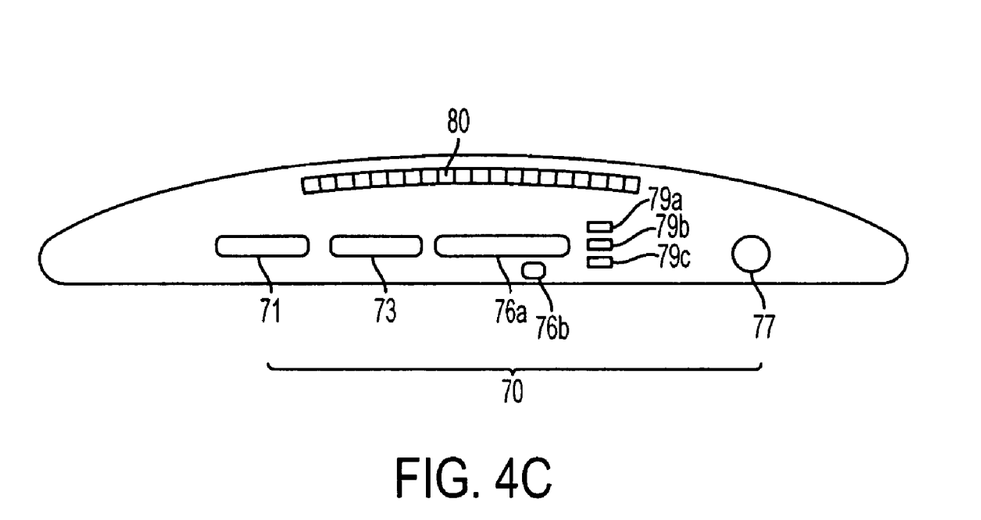
Figure 4D:
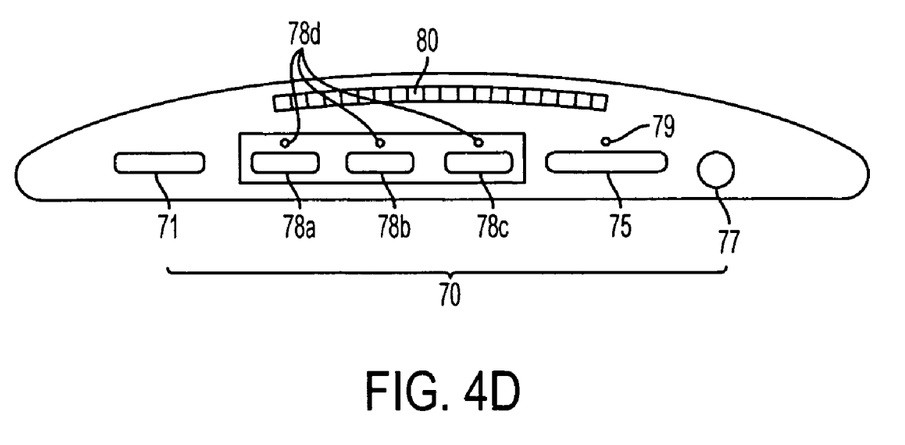

FIGS. 4a through 4c illustrate various embodiments of the input part 70 and the display part 80 in the kimchi refrigerator with a manual fermentation method. FIG. 4d illustrates an embodiment of the input part 70 and the display part 80 in the kimchi refrigerator with an automatic fermentation method.

Referring to FIG. 4a, a first side of the input part 70 is provided with a fermentation button 71 to select a fermentation mode; a refrigeration button 73 to convert into a refrigeration mode after completing the fermentation of food and a memory button 75 allowing to memorize a fermentation level corresponding to a state which the food is fermented to an extent of user's preference.

The fermentation button 71 is selected to ferment food stored in the fermentation apparatus 10. If the fermentation button 71 is selected, the heating/cooling part 60 operates by a controller 30 (to be described later) to apply a fermentation temperature to the storage compartment 50.

The memory button 75 is selected to memorize when the food reaches a predetermined fermentation level, which a user wants to memorize. If the memory button 75 is selected, the controller 30 (to be described later) memorizes the fermentation level of the food sensed by the sensor 20 (to be described later). Here, the number of the memory button 75 may be properly provided according to the number of custom fermentation levels which a user wants to memorize. FIG. 4a illustrates a single custom fermentation level, and FIG. 4b illustrates three custom fermentation levels. Alternatively, the memory button 75 may be provided more as necessary.

Here, even if the custom fermentation level is stored by a user through a first memory button 75a, a new fermentation level may be memorized by selecting the first memory button 75a next time.

Meanwhile, the number of the memory button 75 may not conform to that of storable custom fermentation levels. As shown in FIG. 4c, three or more custom fermentation levels may be stored by using a selection button 76a available for selecting the custom fermentation level and a set button 76b for setting the selected custom fermentation level.

As shown in FIG. 4d, the memory button 75 may be provided in the fermentation apparatus 10 with the automatic fermentation type. For example, if a user selects the automatic fermentation button 78a to ferment food into a well-fermented state, and wants to memorize the predetermined fermentation level while fermenting the food, then a user may select the memory button 75 to store the predetermined fermentation level as the custom fermentation level. Here, the memory button 75 may be plurally provided as necessary. Also, the number and arrangement of the memory button 75 may be provided as shown in FIGS. 4b and 4c.

If the custom fermentation level is stored through the memory button 75, a memory display 79 may be provided to display storage of the custom fermentation level by the controller 30 (to be described later). As shown in FIG. 4a, the memory display 79 may be provided above the corresponding memory button 75 as a light emitting diode (LED), which emits light when the memory button 75 is selected, but not limited thereto. As shown in FIG. 4b, the memory display 79 may be provided as many as the memory button 75. Alternatively, the memory display 79 may be provided as many as the custom fermentation levels as shown in FIG. 4c, regardless of the number of the memory button 75.

The refrigeration button 73 enables a user to manually control the heating/cooling part 60 through the controller 30 (to be described later) to complete the fermentation mode and convert into the refrigeration mode. If the memory button 75 is selected, the controller 30 may control the heating/cooling part 60 to complete the fermentation of the food and at the same time convert into the refrigeration mode automatically, without using an additional refrigeration button 73.

If fermenting the same kind of food into the memorized custom fermentation level after memorizing the foregoing custom fermentation level, a user may select the memory button 75 corresponding to the desired custom fermentation level. Then, the controller 30 controls the heating/cooling part 60 to ferment the food into the memorized fermentation level, thereby repeatedly providing the food at the desired fermentation level without difficulty. After completing the fermentation, the memory display 79 displays the completion of fermentation to make a user manually convert, or to make automatically complete fermentation and convert into the refrigeration mode.

The sensor 20 is provided in a predetermined place in the storage compartment 50 to sense the fermentation level of the food stored in the storage compartment 50. Here, the sensor 20 may be provided anywhere to sense the fermentation level of the food. For example, if an extra container is disposed in the storage compartment 50 to accommodate food, the sensor 20 may be provided therein.

If the memory button 75 is selected, the sensor 20 operates by the controller 30 to sense the fermentation level of the food in the storage compartment 50, or starts sensing as soon as the food is fermented, to transmit information on the fermentation level to the controller 30.

Figure 5:
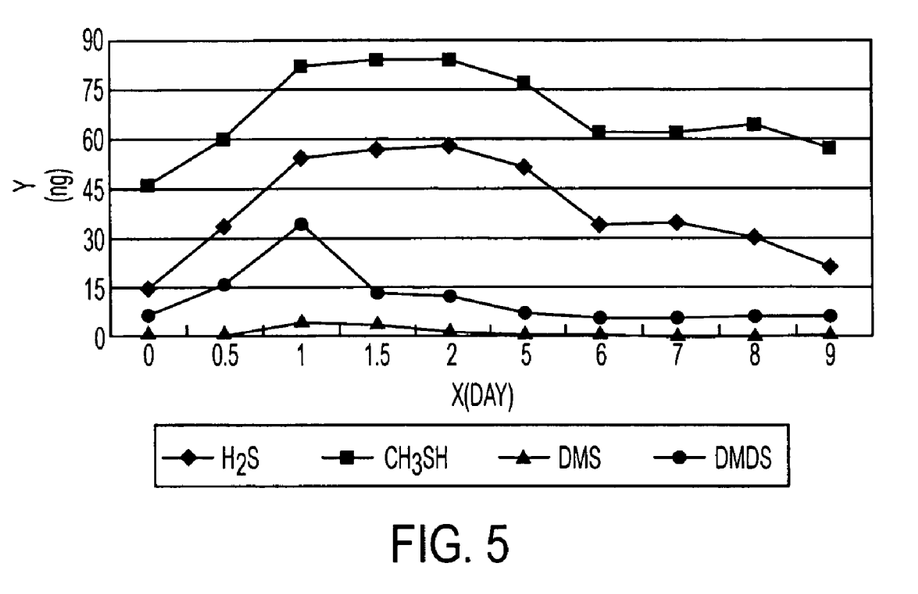
FIG. 5 is a graph illustrating the relation between the fermentation time and the amount of gas generation corresponding thereto.

The sensor 20 may be provided as a gas sensor to sense the concentration of a gas generated from the food in the storage compartment 50, but not limited thereto. FIG. 5 is a graph illustrating the amount of gas generation according to fermentation time during dongchimi, a kind of kimchi, is fermented. Here, an axis X refers to fermentation time (day), and an axis Y refers to the amount of gas generation (ng). Referring to FIG. 5, hydrogen sulfide ($H_2S$), methylmercaptan ($CH_3SH$) and dimethyl disulfide (DMDS) which are generated from dongchimi, increase linearly until the day after a day when fermentation of the food is started. Accordingly, a user may know the fermentation level by detecting the concentration of these gases in the storage compartment 50.

Meanwhile, the sensor 20 may be provided as a gas sensor to sense the generation of the gas when food generates a predetermined gas. For example, as some foods generate the predetermined gas, or increase the concentration of the predetermined gas drastically at a predetermined fermentation level, such characteristics may be sensed by the sensor 20 at the fermentation level to be memorized. The sensor 20 may be provided as a pH sensor to sense pH (acidity) generated from fermented food.

If a user selects the memory button 75, the controller 30 stores the fermentation level of the food sensed by the sensor 20, the fermentation level when selecting the memory button 75, and controls the heating/cooling part 60 to make the fermentation apparatus 10 operate in the fermentation and refrigeration modes. If the memory button 75 is selected, the controller 30 automatically converts from the fermentation mode to the refrigerating mode, or converts manually through input of the refrigeration button 73 additionally provided in the input part 70. Alternatively, fermentation of the food may be continued, and a new fermentation level is stored through reselection of the memory button 75.

If selecting the stored custom fermentation level to custom-ferment the food, i.e. if a user stores the custom fermentation level and restores the same kind of food in the fermentation apparatus 10 and selects the memory button 75 corresponding to the custom fermentation level, then the heating/cooling part 60 is controlled to proceed with fermentation of the food, and at the same time, the sensor 20 is controlled to senses the fermentation level of the food.

Here, the fermentation temperature may be selected by a user, or the controller 30.

At this time, the controller 30 compares a fermentation value according to the fermentation level sensed from the sensor 20 with a stored custom fermentation value to determine a current fermentation level. If determined that the sensed fermentation level does not reach the stored custom fermentation level, the fermentation mode is maintained. If determined that the sensed fermentation level reaches the stored custom fermentation level, the heating part 61 and the cooling part 65 are controlled to complete fermentation and convert into the refrigeration mode. The input part 70 may be provided with the refrigeration button 73 to manually convert from the fermentation mode into the refrigeration mode.

An alarm 90 may be further provided to notify a user that the food reaches the custom fermentation level by the controller 30. Here, the alarming method of the alarm 90 is not limited. For example, the alarm 90 may be provided as a visual alarm, which turns on and off at predetermined intervals, an auditory alarm to generate predetermined alarming sound or both of which may be used.

A display part 80 may be further provided to display the determined fermentation level. At this time, the controller 30 controls the display part 80 to display the determined information thereon to be acknowledged by a user.

The fermentation apparatus 10 according to the first embodiment of the present invention memorizes a desired fermentation level according to users without difficulty, thereby providing food at a uniform fermentation level through the custom fermentation after setting an initial custom fermentation level.

Second Embodiment

Figure 6:
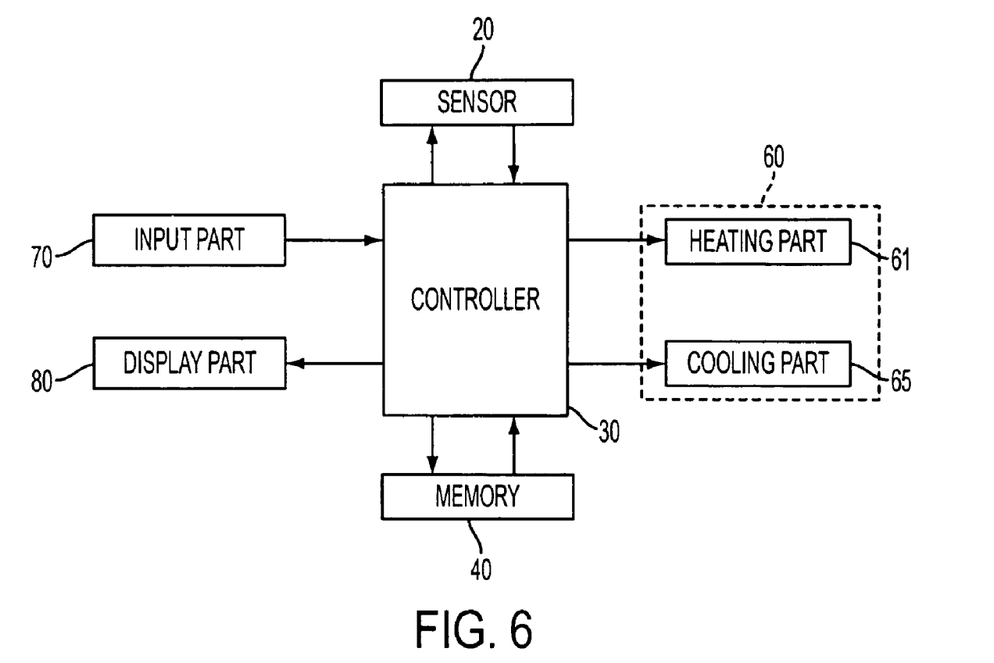
FIG. 6 is a configuration block diagram of a fermentation apparatus according to a second embodiment of the present invention.

As shown in FIG. 6, a fermentation apparatus according to a second embodiment of the present invention comprises a sensor 20, a controller 30, an input part 70, a heating/cooling part 60 and a memory 40.

The memory 40 is provided in a predetermined place in a main body 10. The sensor 20 senses a fermentation level of food and stores information on the fermentation level to the memory 40 through the controller 30 (to be described later). Here, not all the fermentation values sensed by the sensor 20 are stored in the memory 40, and only fermentation values which are sensed when selecting a memory button 75, may be stored in the memory 40.

The information stored in the memory 40 varies according to types of the foregoing sensor 20. For example, if the sensor 20 is provided as a gas sensor to sense the concentration of a gas in a storage compartment 50, the memory 40 is stored with the fermentation value corresponding to the gas concentration. If the sensor 20 is provided as a gas sensor to sense a predetermined gas in the storage compartment 50, the memory 40 is stored with a sensing signal when the predetermined gas is generated in the storage compartment 50. If the sensor 20 is provided as a pH sensor, the memory 40 is stored with the fermentation value corresponding a pH value at the selected fermentation level in the storage compartment 50.

The memory 40 may be stored with fermentation values at each fermentation level of fermented food frequently consumed such as kimchi, as well as the fermentation value at a custom fermentation level, in advance. For example, a fermentation value may be stored in the memory 40 in advance, which corresponds to a pH value of gas concentration at each fermentation level of dongchimi, a kind of kimchi, as shown in FIG. 5. At this time, the controller 30 compares the stored fermentation value and the sensed fermentation values at each fermentation level by the sensor 20 to determine a current fermentation level and display information on the fermentation value of the food on the display part 80.

With this configuration, a custom fermentation method of the fermentation apparatus available for a custom fermentation will be described with reference to FIGS. 7 and 8.

Figure 7:
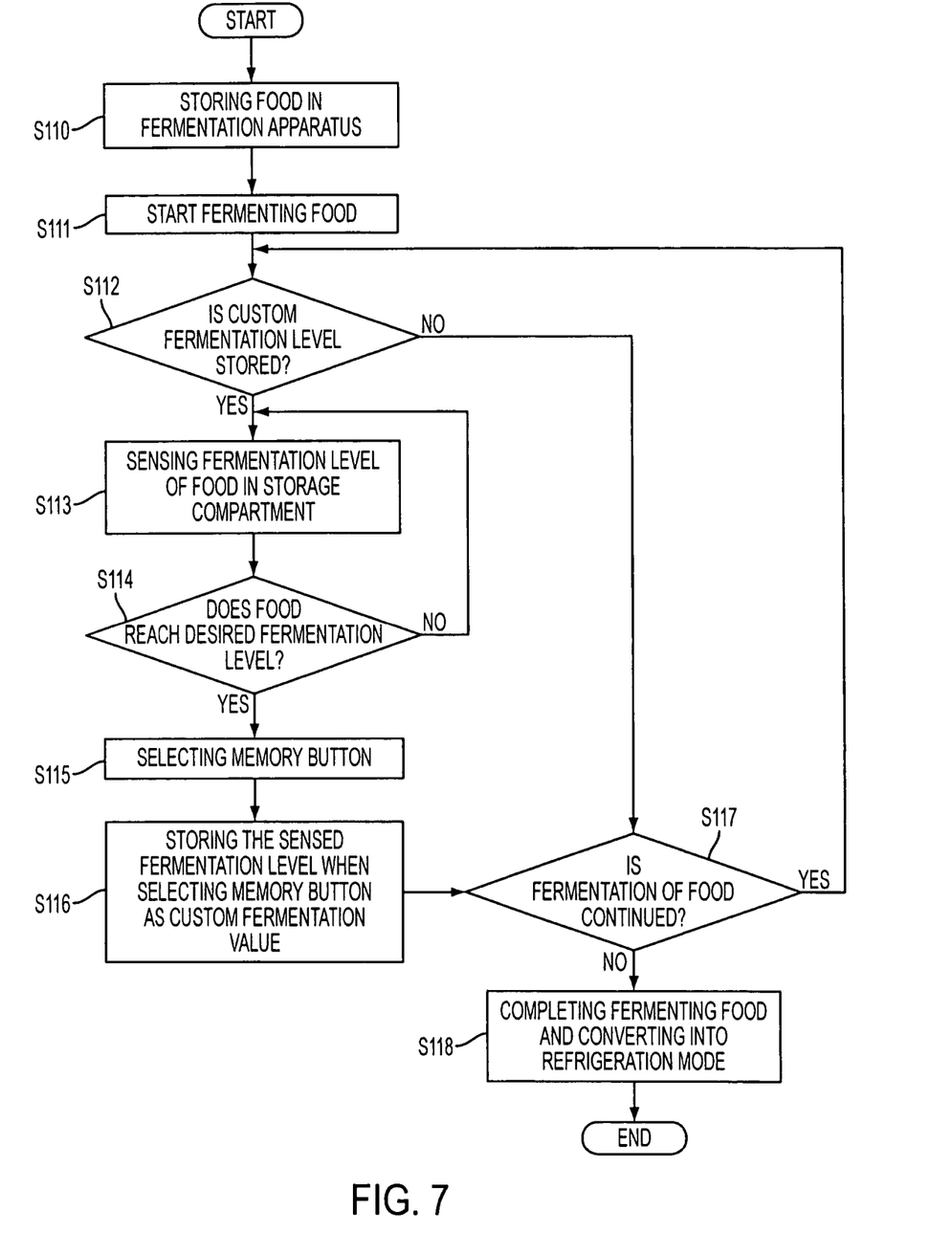
FIGS. 7 and 8 are control block diagrams of a custom fermentation method according to the present invention.
Figure 8:
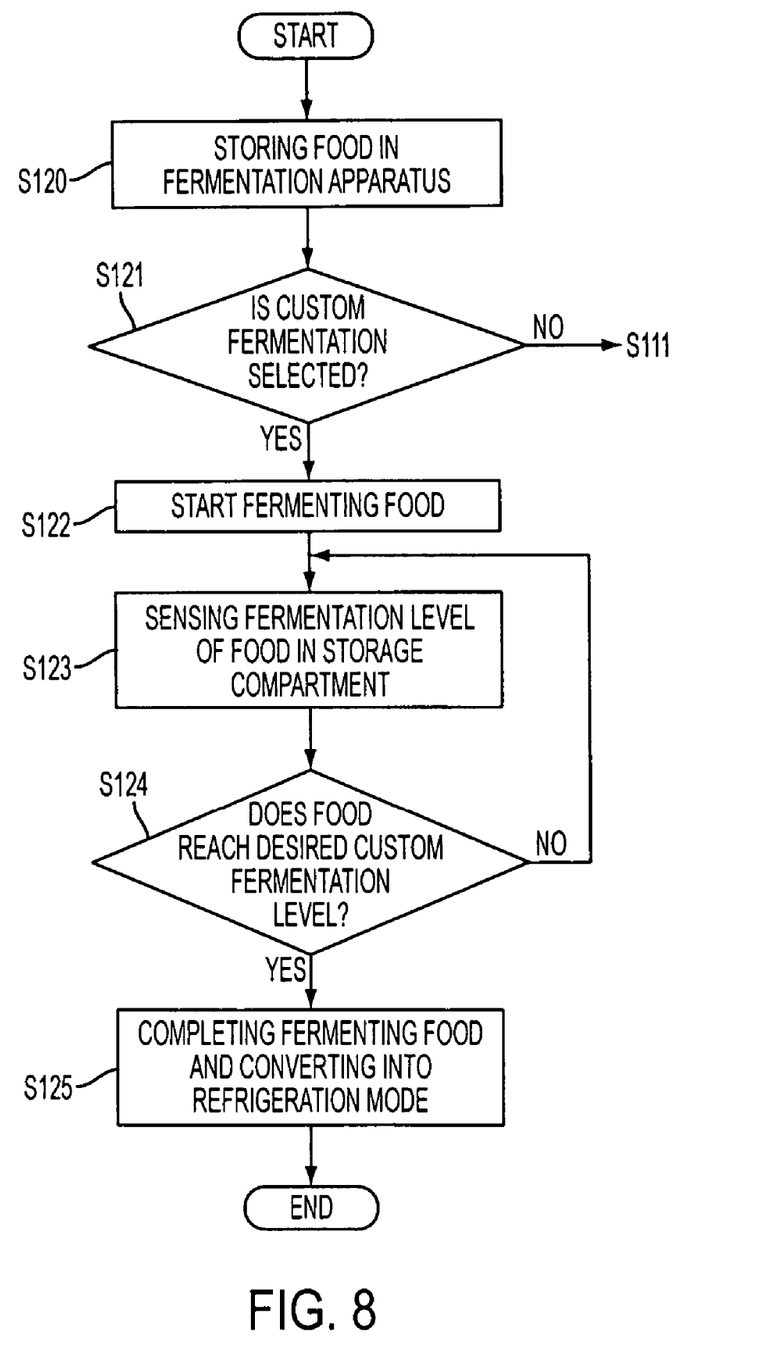

FIG. 7 is a flow chart of an initial stage for setting a custom fermentation level, and FIG. 8 is a flow chart illustrating a method of fermenting food by selecting a set custom fermentation level.

A user stores food in the storage compartment 50 of the fermentation apparatus 10 to ferment it at operation S110, and the fermentation apparatus 10 starts fermenting the food by selecting the fermentation button 71 provided in the input part 70 at operation S111. At this time, a user may set the custom fermentation level or not at operation S112. If a user may not set the custom fermentation level, the fermentation apparatus 10 keeps fermenting the food until receiving an extra command from a user at operation S117. If an automatic fermentation function is selected, the food may be refrigerated after being fermented corresponding to a set operation condition.

After starting fermenting the food, the controller 30 controls the sensor 20 to sense the fermentation level of the food in the storage compartment 50 at operation S113. Here, a user may select the memory button 75 to make the sensor 20 start sensing the fermentation level of the food.

Meanwhile, a user may check the fermentation level of the food while it is fermented. For example, a user may taste, smell or check it through the display part 80 displaying the fermentation level which is determined by the controller 30 after the sensor 20 senses.

If the food reaches the fermentation level which a user wants to memorize, a user may select the memory button 75 to memorize it at operation S115. If the memory button 75 is selected, the controller 30 stores the sensed fermentation level by the sensor 20 as the custom fermentation level at operation S116, which is sensed when selecting the memory button 75. If an extra memory 40 is provided, the controller 30 stores the fermentation value in the memory 40.

Also, the controller 30 controls the heating/cooling part 60 to make the fermentation apparatus 10 converted into the refrigeration mode after completing fermentation of the food through input of the refrigeration button 73 or automatically, at operation S118. For example, if a user wants to set the custom fermentation level into various levels or change the stored custom fermentation level, fermentation may be continued at operation S117.

FIG. 8 is a flow chart of performing the custom fermentation by selecting the set custom fermentation level. First, the same kind of food as the one which was stored for the custom fermentation is stored in the fermentation apparatus 10 at operation S120. A user may select a preset custom fermentation level, change or restore the custom fermentation level to proceed with fermentation at operation S121. At this time, the process shown in FIG. 7 may be performed again.

If a user selects the stored custom fermentation level, the controller 30 controls the heating/cooling part 60 to make the storage compartment 50 heated or cooled for fermentation of the food therein at operation S122. At the same time, the controller 30 controls the sensor 20 to sense the fermentation level of the food at operation S123. The controller 30 receives the information on the fermentation level of the food sensed by the sensor 20 and compares it with the selected custom fermentation value to determine the fermentation level of the food. The display part 80 may display the determined fermentation level of the food.

If sensed by the sensor 20 that the fermentation value of the food reaches the custom fermentation value, the controller 30 controls the heating/cooling part 60 to stop fermenting the food at operation S125. If not reaching the custom fermentation value, fermentation of the food is continued. The completion of fermenting food may be noted through an alarm 90 visually or auditorily.

After completing fermentation of the food, the controller 30 controls the heating/cooling part 60 to convert into the refrigeration mode through input of the refrigeration button 73 or automatically.

Although a few embodiments of the present invention have been shown and described, it will be appreciated by those skilled in the art that changes may be made in these embodiments without departing from the principles and spirit of the invention, the scope of which is defined in the appended claims and their equivalents.

What is claimed is:

1. A fermentation apparatus comprising:
   a storage compartment which is formed with an accommodating space for storing food;
   a temperature changing part to ferment the food in the storage compartment;
   a sensor to sense a degree of fermentation of the food;
   an input part comprising a memory button to initiate memorization of a custom degree of fermentation; and
   a controller to store the degree of fermentation sensed by the sensor as the custom degree of fermentation if a user operates the memory button and to control the fermentation of the food based on the memorized custom degree of fermentation.

2. The fermentation apparatus according to claim 1, wherein the input part further comprises a memory displayer to display storage of the custom fermentation value by the controller.

3. The fermentation apparatus according to claim 1, wherein the controller stores a plurality of custom fermentation values.

4. The fermentation apparatus according to claim 3, wherein the input part is provided with the memory button and the memory displayer corresponding to the number of the custom fermentation values.

5. The fermentation apparatus according to claim 3, wherein the input part is provided with a single memory button and a plurality of memory displayers corresponding to the number of the custom fermentation values.

6. The fermentation apparatus according to claim 1, wherein the controller controls the cooling part to stop fermenting the food and convert into a refrigeration mode if the user operates the memory button.

7. The fermentation apparatus according to claim 1, wherein the sensor is provided as one of a gas sensor and a pH sensor.

8. The fermentation apparatus according to claim 1, wherein the controller controls the sensor to sense the degree of fermentation of the food, and controls the temperature changing part to keep fermenting the food until the fermentation value sensed from the sensor reaches the selected custom fermentation value if a custom fermentation is performed through operation of the memory button corresponding to the stored custom fermentation value by the user.

9. The fermentation apparatus according to claim 8, wherein the controller controls the cooling part to stop fermenting the food and automatically convert into the refrigeration mode if the fermentation value sensed from the sensor reaches the selected custom fermentation value.

10. The fermentation apparatus according to claim 8, further comprising an alarm to notify the completion of fermenting the food by the controller if the fermentation value sensed from the sensor reaches the selected custom fermentation value.

11. A fermentation apparatus comprising a storage compartment which is formed with an accommodating space for storing food and a temperature changing part to ferment the food in the storage compartment, further comprising:
    a sensor to sense a degree of fermentation of the food;
    an input part comprising at least one memory button allowing to memorize the degree of fermentation in a state that the food is fermented to an extent that a user wants to memorize;
    a memory to store a fermentation value; and
    a controller to store the fermentation value from the sensor as a custom fermentation value in the memory if the memory button is operated by the user.

12. The fermentation apparatus according to claim 11, wherein the memory is stored with a plurality of custom fermentation values by the controller.

13. The fermentation apparatus according to claim 11, wherein the controller controls the cooling part to stop fermenting the food and convert into the refrigeration mode if the memory button is operated by the user.

14. The fermentation apparatus according to claim 11, wherein the controller controls the sensor to sense the degree of fermentation of the food, and controls the temperature changing part to keep fermenting the food until the fermentation value sensed from the sensor reaches the selected custom fermentation value if a custom fermentation is performed through operation of the memory button corresponding to the stored custom fermentation value by the user.

15. The fermentation apparatus according to claim 11, wherein the memory contains translation information relating a gas concentration in the storage compartment to the degree of fermentation and/or relating a pH value in the storage compartment to the degree of fermentation.

16. The fermentation apparatus according to claim 15, further comprising a display to display the degree of fermentation of the food, wherein
    the sensor senses the gas concentration and/or pH level in the storage compartment, and
    the controller compares the gas concentration and/or pH level sensed by the sensor with the translation information stored in the memory to determine the degree of fermentation of the food and cause the display to display the degree of fermentation.

17. A fermentation apparatus comprising:
    a storage compartment which has an accommodating space for storing food;
    a temperature changing part to ferment the food in the storage compartment;
    a sensor to sense a degree of fermentation of the food;
    a user input device to allow a user to initiate memorization of a custom degree of fermentation; and
    a controller to store the degree of fermentation sensed by the sensor as the custom degree of fermentation if the user operates the memory button and to control the fermentation of the food based on the memorized custom degree of fermentation.

18. The fermentation apparatus according to claim 1, wherein the temperature changing part is a heating part.

19. The fermentation apparatus according to claim 1, wherein the temperature changing part is a cooling part.

* * * * *